US011968053B2

United States Patent
Kahn et al.

(10) Patent No.: US 11,968,053 B2
(45) Date of Patent: Apr. 23, 2024

(54) RAN COORDINATION FOR HIGH RELIABILITY IN TSN NETWORKS

(71) Applicant: Nokia Technologies Oy, Espoo (FI)

(72) Inventors: Colin Kahn, Morris Plains, NJ (US); Thomas Theimer, Baierbrunn (DE); Alistair Urie, Issy les Moulineaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 68 days.

(21) Appl. No.: 17/633,772

(22) PCT Filed: Aug. 12, 2019

(86) PCT No.: PCT/US2019/046108
§ 371 (c)(1),
(2) Date: Feb. 8, 2022

(87) PCT Pub. No.: WO2021/029862
PCT Pub. Date: Feb. 18, 2021

(65) Prior Publication Data
US 2022/0303070 A1     Sep. 22, 2022

(51) Int. Cl.
*H04L 1/22*     (2006.01)
*H04W 12/084*     (2021.01)
(Continued)

(52) U.S. Cl.
CPC .............. *H04L 1/22* (2013.01); *H04W 12/084* (2021.01); *H04W 12/61* (2021.01);
(Continued)

(58) Field of Classification Search
CPC .......... H04W 12/61; H04W 60/00; H04L 1/22
See application file for complete search history.

(56) References Cited

U.S. PATENT DOCUMENTS

2014/0301180 A1     10/2014 Sivapuram et al.
2015/0134626 A1     5/2015 Theimer et al.
(Continued)

FOREIGN PATENT DOCUMENTS

WO     2019/048384 A1     3/2019
WO     2020/204949 A1     10/2020

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0, Jun. 2019, pp. 1-117.
(Continued)

*Primary Examiner* — Sulaiman Nooristany
(74) *Attorney, Agent, or Firm* — Robert P. Michal, Esq.; Carter, DeLuca & Farrell LLP

(57) ABSTRACT

Methods and apparatus, including computer program products, are provided for coordinating actions, such as handovers. In some example embodiment, there may be provided a method to control an action at a group including a first user equipment being served by a first base station and a second user equipment being served by a second base station, each of the first user equipment and the second user equipment configured with a protocol data unit session to carry redundant time sensitive streams, wherein the control includes providing a token to enable at a time the action at a single one of the first user equipment or the second user equipment.

11 Claims, 11 Drawing Sheets

(51) Int. Cl.
H04W 12/61 (2021.01)
H04W 36/00 (2009.01)
H04W 36/08 (2009.01)
H04W 60/00 (2009.01)
H04W 76/15 (2018.01)
H04W 80/02 (2009.01)

(52) U.S. Cl.
CPC ....... H04W 36/0009 (2018.08); H04W 36/08 (2013.01); H04W 60/00 (2013.01); H04W 76/15 (2018.02); H04W 80/02 (2013.01)

(56) References Cited

U.S. PATENT DOCUMENTS

| | | | |
|---|---|---|---|
| 2015/0134840 A1* | 5/2015 | Thompson | H04N 5/76 709/228 |
| 2017/0163744 A1 | 6/2017 | Lida et al. | |
| 2017/0366618 A1 | 12/2017 | Vrzic et al. | |
| 2018/0098250 A1 | 4/2018 | Vrzic et al. | |
| 2018/0262912 A1 | 9/2018 | Goldhamer | |
| 2018/0302834 A1 | 10/2018 | Zhang et al. | |
| 2020/0127994 A1* | 4/2020 | Kukreja | G06F 21/31 |
| 2022/0361275 A1* | 11/2022 | Da Silva | H04W 76/18 |

OTHER PUBLICATIONS

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.2.0, Jun. 2019, pp. 1-93.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.5.0, Mar. 2019, pp. 1-68.

"Scalance XB216", Smart Factory, Retrieved on Jan. 27, 2022, Webpage available at : https://smartfactory.ie/product/scalance-xb216/.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"New solution for Key Issue #2: Lossless handover by inter-UE coordination with multiple UEs per device", SA WG2 Meeting #129BIS, S2-1812015, Agenda: 6.20, Orange, Nov. 26-30, 2018, 3 pages.

"Some considerations around TSN", SA WG2 Meeting #128bis, S2-188460, Agenda: 6.15, Qualcomm Incorporated, Aug. 20-24, 2018, pp. 1-14.

"IEEE Standard for Local and Metropolitan Area Networks—Bridges and Bridged Networks", IEEE Computer Society, IEEE Std 802.1Q™-2018, 2018, 1993 pages.

"IEEE 802.11", Wikipedia, Retrieved on Jan. 27, 2022, Webpage available at : https://en.wikipedia.org/wiki/IEEE_802.11.

"IEEE 802.15", Wikipedia, Retrieved on Jan. 27, 2022, Webpage available at : https://en.wikipedia.org/wiki/IEEE_802.15.

"IEEE 802.16", Wikipedia, Retrieved on Jan. 27, 2022, Webpage available at : https://en.wikipedia.org/wiki/IEEE_802.16.

International Search Report and Written Opinion received for corresponding Patent Cooperation Treaty Application No. PCT/US2019/046108, dated Oct. 29, 2019, 15 pages.

* cited by examiner

RAN COORDINATION FOR HIGH RELIABILITY IN TSN NETWORKS

RELATED APPLICATION

This application claims priority to PCT Application No. PCT/US2019/046108, filed on Aug. 12, 2019 each of which is incorporated herein by reference in its entirety.

FIELD

The subject matter described herein relates to ultra-reliable low-latency communications and/or time sensitive networking.

BACKGROUND

Time sensitive networks (TSN) may be used to support a variety of applications including applications such as ultra-reliable low-latency communications (URLLC), industrial verticals, and/or the like. In the case of industrial verticals and other mission critical applications, there may be some requirements that are relatively unique, such as certain requirements for low latency, deterministic data transmission, and high reliability, when compared to other 5G cellular services.

SUMMARY

In some example embodiment, there may be provided an apparatus comprising at least one processor and at least one memory including computer program code, the at least one memory and the computer program code configured to, with the at least one processor, cause the apparatus to at least: determine a first user equipment is part of a group of user equipment including the first user equipment and a second user equipment, each of the first user equipment and the second user equipment configured with a protocol data unit session to carry redundant time sensitive data streams; receive, from a token coordination function, a token response; allow the action, when the token is received in the token response; and inhibit the action, when the token is not included in the token response and/or the token is expired.

In some variations, one or more of the features disclosed herein including the following features can optionally be included in any feasible combination. The apparatus may be further caused to at least request, from the token coordination function, the token. The apparatus may be further caused to at least determine whether the token is present at the apparatus before the request for the token is sent to the token coordination function. The received token response may include an indication that the token is not available, the indication indicating to the apparatus to inhibit the action. The token response may be received in response to the request for the token being sent to the token coordination function. The token response may be received as a push from the token coordination function, without the request for the token being sent to the token coordination function. The action may include a handover to a target base station serving the first user equipment or the second user equipment. The action may include a radio resource control reconfiguration. The apparatus may be further caused to at least send a token release message to the token coordination function. The apparatus may comprise or be comprised in a base station. The token coordination function may be comprised in the apparatus. The apparatus may be further caused to at least send a token release message to the token coordination function after completion of the action. The first user equipment and the second user equipment may include an endpoint, which includes at least one time sensitive network translator, wherein the endpoint interfaces a time sensitive network providing the redundant time sensitive data streams.

In some example embodiment, there may be provided an apparatus comprising at least one processor and at least one memory including computer program code, the at least one memory and the computer program code configured to, with the at least one processor, cause the apparatus to at least: control an action at a group including a first user equipment being served by a first base station and a second user equipment being served by a second base station, each of the first user equipment and the second user equipment configured with a protocol data unit session to carry redundant time sensitive streams, wherein the control includes providing a token to enable at a time the action at a single one of the first user equipment or the second user equipment.

In some variations, one or more of the features disclosed herein including the following features can optionally be included in any feasible combination. The token may be provided to first base station serving the first user equipment, the control includes inhibiting the action at the second base station serving the second user equipment by not providing the token. The apparatus may be distributed among the first base station and the second base station. The apparatus may be centralized at a network node, which may include an access and mobility management function. The apparatus may be further caused to track the group including the token and corresponding base station serving each user equipment in the group. The apparatus may be further caused to at least receive a registration request to register the group as using protocol data unit sessions to carry the redundant time sensitive streams. The apparatus may be further caused to at least receive a request for the token from one of the first base station or the second base station attempting to initiate the action. The action may include a handover to a target base station that will serve the first user equipment or the second user equipment. The apparatus may be further caused to at least send a token release message to another token coordination function. The action may include a radio resource control reconfiguration. The apparatus may be further caused to initiate the action by pushing to the first base station or the second base station the token that allows the action.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
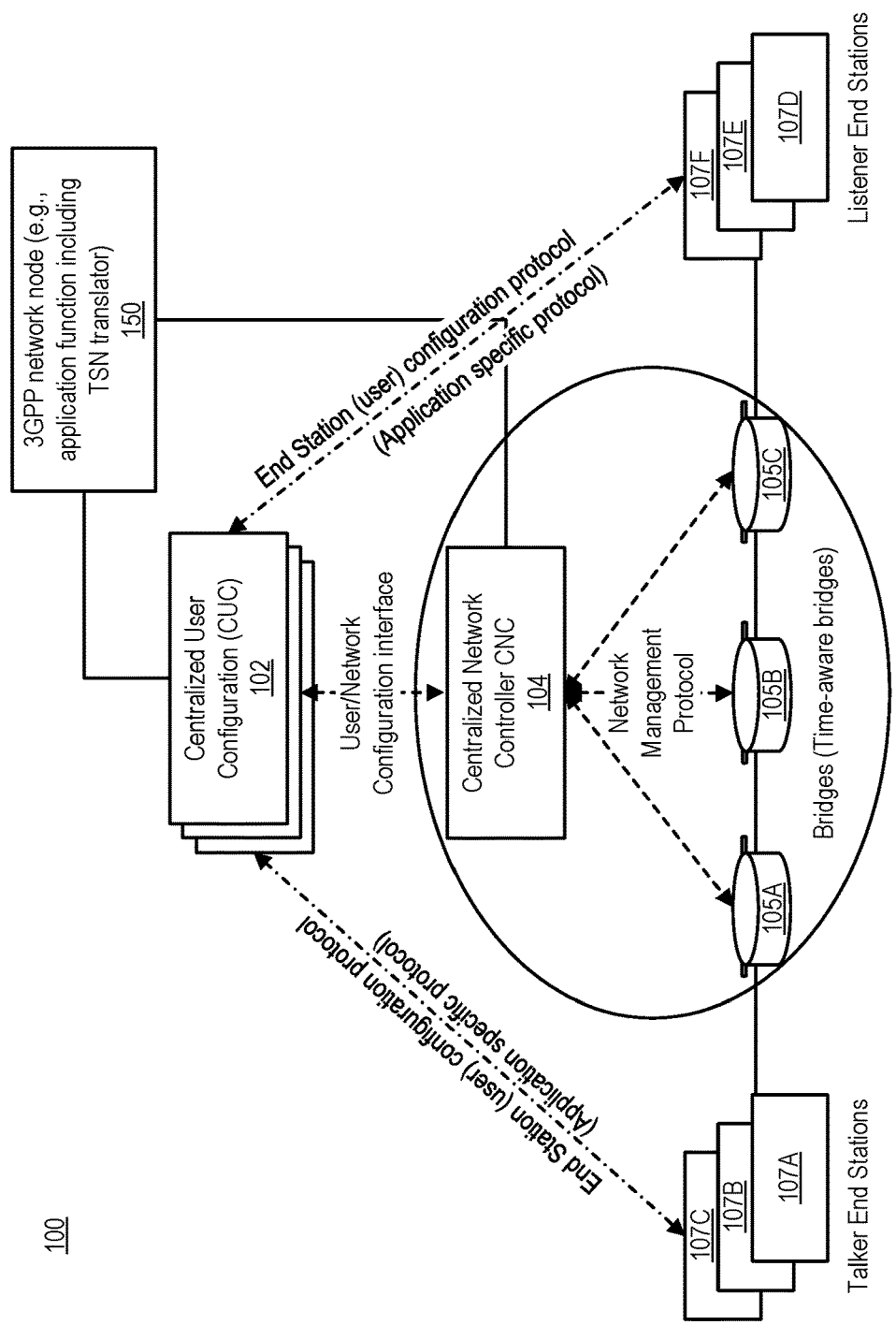
FIG. 1A depicts an example of a portion of a time sensitive network, in accordance with some example embodiments.

Like labels are used to refer to same or similar items in the drawings.

DETAILED DESCRIPTION

In TSN networks utilizing the cellular wireless system, there may be provided a 3GPP bridge (also referred to herein as a 5G bridge) to provide the wireless functionality of a traditional wired, TSN bridge. To provide reliability and low latency, redundancy may be used. This redundancy may include at least two paths, with for example separate PDU sessions, carrying a TSN traffic flow. The TSN traffic flow may be replicated to at least both PDU sessions, allowing one session to be interrupted briefly, without impacting the end-end TSN flow. And, the redundancy may further include using at least two UEs at the same endpoint. These two UEs may be independent in the sense that if one UE fails the redundant path of the other UE is not affected. But when two UEs are used at an endpoint to provide redundancy, an action may be triggered for both UEs, such as a handover at the same time—increasing the likelihood of an interruption in the end-to-end TSN service. In some example embodiments, there is provided a way to coordinate an action, such as a handover, when there are at least two, redundant UEs at an endpoint, wherein these redundant UEs use redundant PDU sessions carrying TSN data over the 3GPP cellular wireless network. Before providing additional examples, the following provides some additional information regarding TSN and the 3GPP bridge.

FIG. 1A depicts an example of a TSN network 100 configured in a centralized configuration model, although other configuration models may be implemented as well. One or more aspects of the centralized configuration model may be in accordance with IEEE 802.1Qcc, chapter 46. In the TSN network example of FIG. 1A, the network may include a centralized user configuration (CUC) function 102, a centralized network controller (CNC) 104 function, one or more TSN bridges 105A-C, and one or more end stations 107A-D.

The CUC 102 may be configured in accordance with the one or more of the IEEE 802.1 series of TSN standards (see, e.g., 802.1Qcc, clause 46.2), and application specific protocols may be implemented between end stations and the CUC. The CUC may control the configuration of end stations 107A-F and/or applications at the end stations. The CUC may also interface with the network to convey end station (e.g., user) requirements. For example, the CUC may interface with the CNC 104 to make requests to the CNC for deterministic, TSN communications (e.g., TSN flows) with specific requirements for those flows between end stations. The TSN flow may represent a time sensitive, deterministic stream of traffic between end stations. These TSN flows may have low delay and/or strict timing requirements for time sensitive networks. For example, a TSN flow between end stations may be used in an industrial control application (e.g., robot, etc.) requiring low delay and/or strict, deterministic timing between the end stations.

The CNC 104 may receive network topology information from TSN bridges 105A-C, including the corresponding interconnections, and may determine a path between endpoints that require deterministic communication. The CNC may define the schedules on which all TSN traffic is transmitted between the end stations including any intervening devices such as the TSN bridges 105A-C.

The TSN bridges 105A-C may be implemented as Ethernet switches, for example. The TSN bridges are configured to transmit and/or receive TSN flows. The TSN flow may be in the form of Ethernet frames transmitted and/or received on a schedule to meet the low delay and/or deterministic requirements of the TSN flow. For example, the talker end station 107A may transmit traffic based on a schedule (see, e.g., IEEE 802.1Qbv) to a bridge 105A, which may also receive and/or transmit traffic to another device based on a schedule.

The end stations 107A-F may be a source and/or a destination of a TSN flow. The end stations may include an application, such as an industrial application or other application requiring low delay and/or other time sensitive requirement for a deterministic traffic flow. The end stations may also be referred to as talkers and listeners. Talker end stations 107A-C refer to an end station which at a given instance is "talking," such as transmitting in accordance with TSN, while the listener end stations 107D-F refer to an end station which at a given instance is "listening." For example, each of the end stations may include circuitry to transmit (e.g., in the case of a "talker") and/or receive (e.g., in the case of a "listener") using for example, Time Sensitive Network (TSN) circuitry that enables communications over a TSN network in accordance with the IEEE suite of 802.1 series of standards.

Figure 1B:
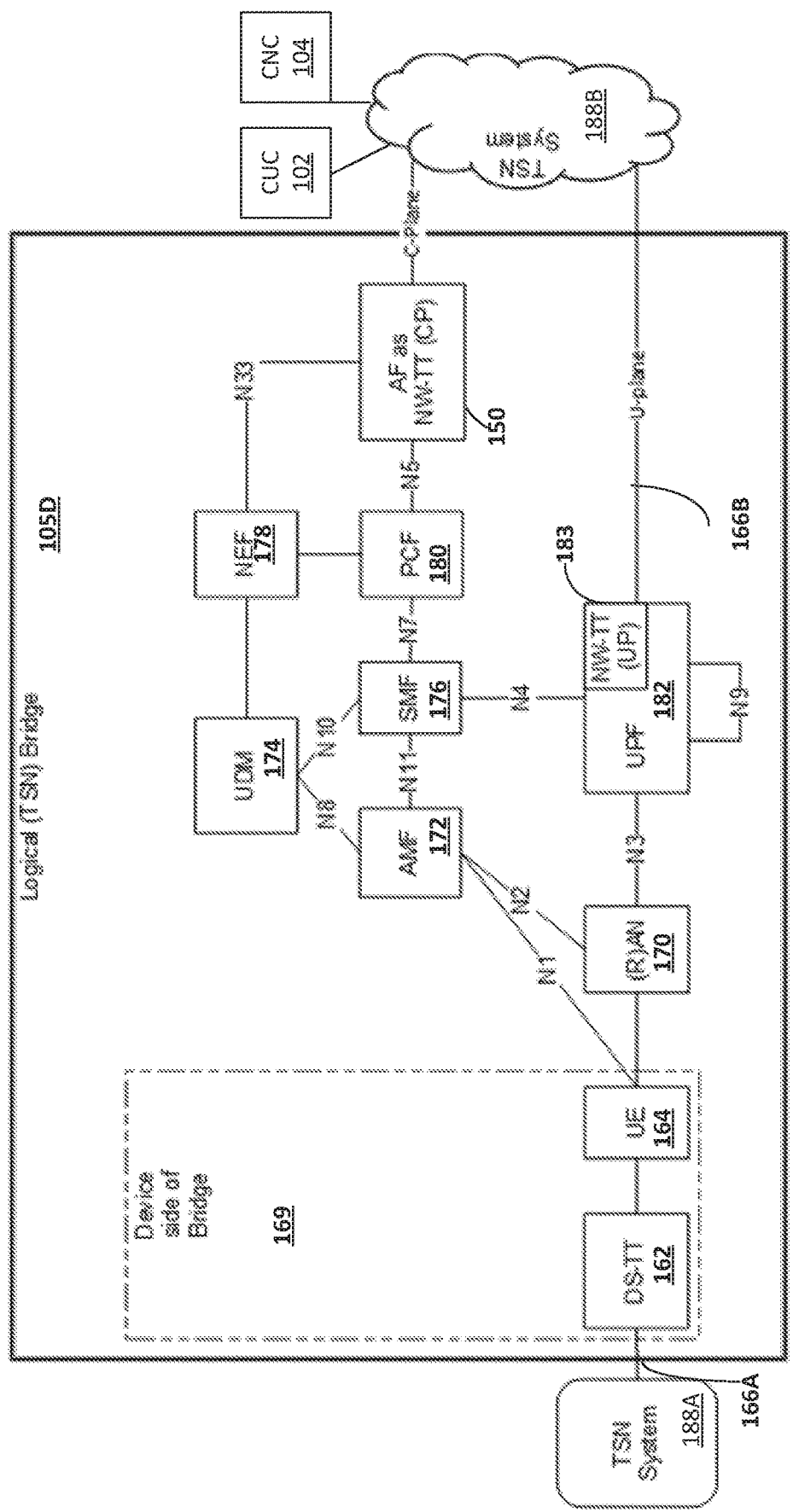
FIG. 1B depicts an example of a 3GPP bridge for a time sensitive network, in accordance with some example embodiments.

FIG. 1B depicts an example of a TSN bridge 105D, in accordance with some example embodiments. The TSN bridge 105D is also referred to herein as a 3GPP bridge 105D as the 3GPP bridge 105D is implemented as part of the cellular wireless system, such as the 5G system.

In the example of FIG. 1B, the TSN system 188A may comprise the end station 107A, which may access the 3GPP bridge 105D via for example a wired connection to a device side of bridge including a 3GPP user equipment (UE) 164 (generally referred to herein as a UE) and a device side (DS) TSN translator (TT) 162 to perform translation between TSN and 3GPP wireless formats and protocols. The TT may be in accordance with a standard, such as 3GPP TS 23.501. The user equipment 164 may establish a connection with a user plane function 182 (which also includes the user plane (UP) part of the network side (NW) TSN translator (TT)) via a radio access network (RAN) 170, such as a 5G gNB or other type of base station. The UPF 182 including the NW TT 183 may provide a TSN compatible user plane data flow to TSN system 188B, which may comprise the end station 107D for example. Thus, this connection via the RAN represents the wireless part of the end-to-end connection between the TSN system 188A and TSN system 188B. The DS TT 162 and NW-TT 183 may translate TSN user plane data between the TSN system and the 3GPP System (e.g., via an ingress port 166A at the device side of bridge 169 and an egress port 166B at the UPF 182). Although FIG. 1B depicts the NW TT 183 at the UPF 182, the NW TT may be located at other nodes as well. In the example of FIG. 1B, the UE 164 and DS-TT 162 may provide the device side 169 of the bridge.

FIG. 1B also depicts other 3GPP network elements including core network elements, such as an Access and Mobility Management Function (AMF) 172, a User Data Management (UDM) function 174, a Session Management Function (SMF) 176, a Policy Control Function (PCF) 180, a Network Exposure Function (NEF) 178, and an Application Function (AF) 150. In the example of FIG. 1B, the AF 150 also includes the control plane part of the NW TT. Although FIG. 1B depicts the NW-TT as part of the bridge 105D, it may alternatively be outside of the bridge 105D (e.g., in the TSN side of the interface).

In some example embodiments, one or more nodes of the 3GPP bridge 105D may interface with the CUC 102 and/or CNC 104 to obtain information regarding the end station requirements for the TSN flow connection(s). For example, the AF 150 may interface to the TSN's CUC 102 and/or CNC 104 to obtain information regarding the TSN flows between TSN systems 188A-B (e.g., end stations). The 3GPP bridge 105D may include one or more radio access networks 170 (e.g., a radio access network served by a base station, gNB, eNB, and/or other nodes including wireless LAN (WLAN) access nodes) to enable wireless connectivity for an end-to-end TSN flow between the TSN systems. Referring again to FIG. 1A, one or more of the bridges 105A-C may be implemented using the 3GPP bridge 105D of FIG. 1B to provide TSN support over the 5G wireless system. From the perspective of the end stations 107A-C and 107D-F and time aware bridges 105A-C, for example, the 5G system's 3GPP bridge 105D appears like a more traditional wired TSN bridge.

The establishment of end-to-end (E2E) communications between TSN systems 188A-B may include phases, such as a pre-configuration and authentication phase, a network discovery phase, a stream requirements and schedule computation phase, and a configuration of the bridges and the end stations phase.

During the pre-configuration phase, the end stations may be configured with the TSN flow's (also referred to as a stream or a TSN stream) QoS requirements. The QoS requirements for an end station's application may be pre-defined or known. For example, a temperature sensor application at end station 107A may have a known QoS requirement for communication with an end station listener 107D. In this example, the talker end station may transmit streams at regular intervals (e.g., a cyclic communication), although the transmission may occur at other times as well (e.g., based on event triggering, such as in the case of a temperature sensor whenever a temperature rises above a certain threshold). The TSN bridges may also be pre-configured with parameters such as bridge delay objects. For example, the TSN bridges may be configured with bridge delays, which may be port-pair and traffic-class specific. Moreover, TSN may support up to 8 traffic classes, to which 8 priority classes are mapped. Each priority class may have a traffic class defined. Therefore, a TSN bridge's ingress port and egress port mapping may have 8 traffic classes resulting in 8 delay-value tuples. Each delay-value tuple may include a maximum delay and minimum delay, which may be divided into packet length dependent and independent parts. For example, each tuple (e.g., TSN bridge ingress port-TSN bridge egress port and corresponding TSN traffic class). The bridge's delay may be captured in a managed object including: frame-length-independent delay (minimum); frame-length-independent delay (maximum); a frame-length-dependent delay (minimum); and/or a frame-length-dependent delay (maximum).

During network discovery phases, the TSN bridges and the end stations may utilize a link layer discovery protocol (LLDP) to exchange the port MAC address and link propagation delay with adjacent network elements, such as other TSN bridges, the CNC 104, and/or the like. The LLDP may be used periodically and/or may be triggered by a change in one of the LLDP parameters. The CNC 104 may crawl through the network and read the TSN bridge's managed objects, such as bridge delay objects, propagation delay objects, and port MAC address table. From this, the CNC may build a view of the network topology. The CNC may also know the bridge and link capacities in the network. To collect this information, the CNC may use simple network protocol (SNMP) and message information bases such as those defined in IEEE 802.1Q as well as other techniques (e.g., the NETCONF protocol or RESTCONF protocols together with YANG data models).

During the stream requirements phase and schedule computation phase, the CUC 102 may read the TSN flow requirements from the end stations using an application-specific protocol. The CUC may translate these requirements into corresponding TSN stream requests that are understandable by the CNC 104. The CNC (which has the knowledge of the complete network) may compute the schedules including computing the paths for each end-to-end communication flow between end stations (via the TSN bridges 105A-D), priorities for the TSN streams, the time window a talker is expected to transmit and a listener is expected to receive frames, and the configuration of the TSN bridges including port forwarding and gating control. Depending on whether requests can be satisfied or not, the corresponding response may be given to the CUCs.

During the bridge and end station configuration phase, the CUC 102 may trigger the CNC 104 to configure the TSN bridges with the parameters for establishment of the end-to-end connection (which may include the schedules for the connections) for the TSN stream between end stations (via the TSN bridges). The CNC may perform a network check if something has changed in the network, and may then configure the TSN bridge managed objects. After configuring the TSN bridges, the CNC may provide the CUC with the configuration parameters for the talker and the listener end stations. The CUC may, as noted, configure the end stations as well as the applications at the end stations (which may include the schedules for transmission and reception over the connection for the TSN flow). At this point, the network 100 is ready for TSN communications between end stations.

To provide the 3GPP bridge 105D for TSN, the 5G system (or one or more nodes therein) may expose towards TSN entities (e.g., the CUC 102, CNC 104, and/or TSN end stations 107A-F) the same or similar set of parameters as a standard, wired IEEE 802.1, TSN bridge. In this way, the 5G system's 3GPP bridge 105D may resemble the behavior of a more traditional wired IEEE 802.1, wired TSN bridge, such as bridges 105A-C. Referring again to FIG. 1B, the bridge delay would represent the delay between port pairs, such as 166A-B. As TSN is low delay and deterministic, the 5G system may provide certain delay guarantees to provide the QoS needed to achieve these delay guarantees for a TSN flow.

Referring again to the CNC 104, it may use a set of managed objects in order to acquire the information about the TSN bridges, build the knowledge about the network capabilities, and configure each TSN bridge. As noted, one or more of these TSN bridges 105A-C may be wirelessly provided by the 5G system in the form of a 3GPP bridge 105D to provide wireless connectivity between a pair of end stations, such as end station 107A and 107D (each of which may comprise, as noted, a UE including a TT).

The managed objects may include information, such as bridge delay, propagation delay, static trees, and/or Multiple Registration Protocol extended control (see, e.g., IEEE 802.1Q-2018, IEEE Standard for Local and Metropolitan Area Networks, Bridges and Bridged Networks). The bridge delay may be of importance for operations of the integrated TSN-3GPP network. The attributes of a bridge delay managed object may determine the delay of frames, which pass through the 3GPP bridge itself. In the so-called "TSN fully centralized configuration model" for example, the TSN's CNC 104 may expect that the bridge delay be expressed through the values that are dependent and independent of the frame length. For each possible connection between two ports of a bridge and a traffic class, a corresponding minimum and maximum packet size independent and packet size dependent delay parameters need to be provided (e.g., four values per port pair and traffic class). Assuming for example that N user equipment (UEs) and 1 user plane function (UPF) would be involved in a 3GPP bridge provided by the 3GPP/5G system, the UEs and UPF may each have one port, with each port supporting a maximum 8 traffic classes. In the example of FIG. 1B, the 5G system is integrated transparently as a bridge 105D into a TSN network, with TSN Translators in the device side of bridge (DS-TT) 162 and UPF (NW-TT UP) 182 for user plane (UP) and AF (NW-TT CP) 150 for control plane. The translators provide interoperability between wired, IEEE TSN network bridges (which operate primarily in accordance with the IEEE suite of TSN protocols) and the 5G core, RAN, and UE (which operate in accordance with 3GPP protocols). In this way, the 3GPP protocols are in a sense hidden from connected TSN networks. The TTs may enable the 3GPP bridge 105D (also referred to as a 5G bridge) to appear transparently as ports in the user and control planes, and may enable the 3GPP bridge 105D to be configured as a bridge in the management plane of the other IEEE TSN network bridges, such as bridges 105A-C at FIG. 1A.

Figure 1C:
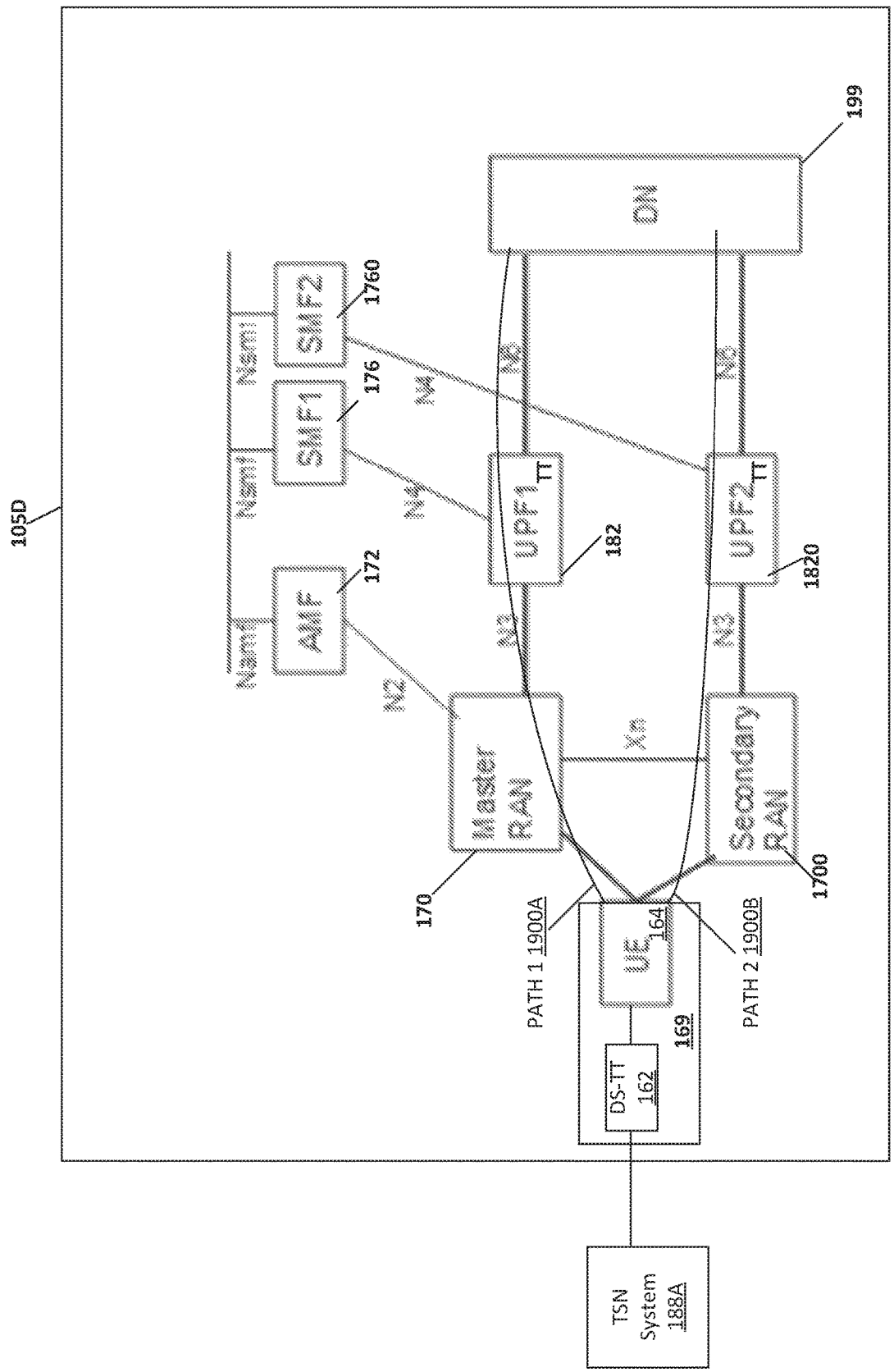
FIG. 1C depicts an example of redundant paths to provide the QoS for needed for TSN and URLLC, in accordance with some example embodiments.

FIG. 1C depicts an example architecture in which there is provided redundancy over two paths 1900A-B to provide the QoS needed for TSN and/or URLLC with respect to latency and reliability (see, e.g., 3GPP TR 23.725, and 3GPP TS 23.501, SA2 #133). Referring to FIG. 1C, the UE 164 (which is part of the device side of the bridge 169 and which may include DS-TT 162) may use dual connectivity to establish protocol data unit (PDU) sessions to separate UPFs 182 and 1820. To improve reliability, these redundant paths 1900A-B for the PDU sessions are setup through different access nodes, such as a master RAN 170 and at least one secondary RAN 1700. For example, the paths 1900B may carry some, if not all, of the data carried on path 1900A to provide redundancy. The data network (DN) 199 may thus see both paths 1900A-B. And, noted techniques, such as FRER (802.1CB), and the like, may be used to generate parallel, duplicate TSN flows.

Alternatively or additionally, two UEs may be associated with the same endpoint 169, in accordance with some example embodiments. When two UEs and two corresponding DS-TTs) are used at the end point (e.g., the interface between the 3GPP bridge 105D and the TSN system 188A to provide redundancy for TSN and/or URLLC, each of the UEs may independently setup PDU sessions, eliminating even the UE as a single point of failure. The two UEs may be configured to select different RANs, such as gNBs, and to setup PDU sessions to UPFs with separate failure modes. Other aspects include providing redundancy over a portion of the user plane paths, for example via redundant N3 tunnels between a single 5G RAN node and a UPF, and enhanced user plane reliability/availability (e.g., by facilitating PDU session anchor relocation for Ethernet PDU sessions). The redundant PDU sessions over the paths may be fully redundant (e.g., the data carried on one path is duplicated over the second path), partially redundant (e.g., some of the data carried on one path is duplicated over the second path), or alternatively redundant (e.g., the data from the TSN system is alternated so that a first packet goes over one path, the second packet over the second path, the third over the first path, and so forth). Although the previous example described two UEs and two DS-TTs at the endpoint 169 to provide redundancy, other quantities of UEs and DS-TTs (e.g., fewer or greater) may be implemented as well in the endpoint 169.

In 3GPP, handovers occur when a radio resource management (RRM) function in a source base station, such as a 5G gNB type base station, determines, based on for example measurement reports received from the UE and other factors, that the UE may be better served by a neighbor cell and the neighbor RRM admission control accepts the handover. These handovers may occur at any time. During handovers, in-flight packets are forwarded over the Xn/X2 interface from source gNB base station to the target gNB base station, so typically there is no data loss. However, a delay may be introduced during handover as the UE receives an RRC reconfiguration message, detaches from the source cell (e.g., the source gNB base station), retunes, synchronizes to the new, target cell (e.g., the target gNB), establishes user plane connectivity, and sends an RRC reconfiguration complete message to the target gNB base station. This delay is also introduced as packets are forwarded from source gNB base station to the target gNB base station, and the delay may include delays attributed to multiple bridge hops in the Xn/X2 transport network.

For most applications, the delay associated with the action of the handover to the target cell (e.g., the target base station serving the cell) and the additional user plane delay due to forwarding is of no consequence as no packets are dropped. However, in the case of TSN and/or URLLC, this delay may be problematic. In the case of redundant paths for example, at least one of the paths is supposed to be always available during a transmit window, even during handover. To illustrate further, the 3GPP bridge 105D may be needed during a precise time window. But the handover disruption and added delay caused by packet forwarding may cause one or more missed transmissions on a path, which from a reliability perspective is the equivalent of a packet drop. Particularly for applications where the survival time (e.g., the time that an application consuming the communication service may continue without an anticipated message) is low, this disruption may be unacceptable for the delay requirements of deterministic systems, such as TSN and/or URLLC.

When there is more than one path 1900A-B with redundant packet transmission through the 5G system as shown at FIG. 1C for TSN and/or URLLC, a momentary disruption on a path due to handover may not interrupt the end-to-end TSN service. In the case of FIG. 1C for example, redundant packets on the alternative path may continue to be sent over the air-interface, within the required transmit window. But if handovers on both paths 1900A-B occur simultaneously, an interruption in the end-to-end service can occur—affecting the QoS and other requirements of the TSN end-to-end service and/or URLLC.

When a single UE 164 is at an endpoint 169 (e.g., with dual connectivity to a master node 170 and at least one secondary node 1700 as shown in FIG. 1C) is configured, coordination may be needed so that an action, such as a handover which may interrupt service, does not occur simultaneously on each leg of the dual connectivity. This coordination may be provided by a network node, such as the master node 170. The master node may implement a "Secondary Node Change Procedure" initiated by the master node (see, e.g., 3GPP TS 37.340, section 10.5) for secondary node 1700 handover, and the "Inter-Master Node handover" without Secondary Node change for a master node handover (see, e.g., 3GPP TS 37.340, section 10.7).

But when at least two UEs are used at an endpoint 169 to provide redundancy to protect against UE failure, a different coordination mechanism is needed to prevent handovers on both paths occurring at the same time—which may cause an interruption in the end-to-end TSN service.

Figure 1D:
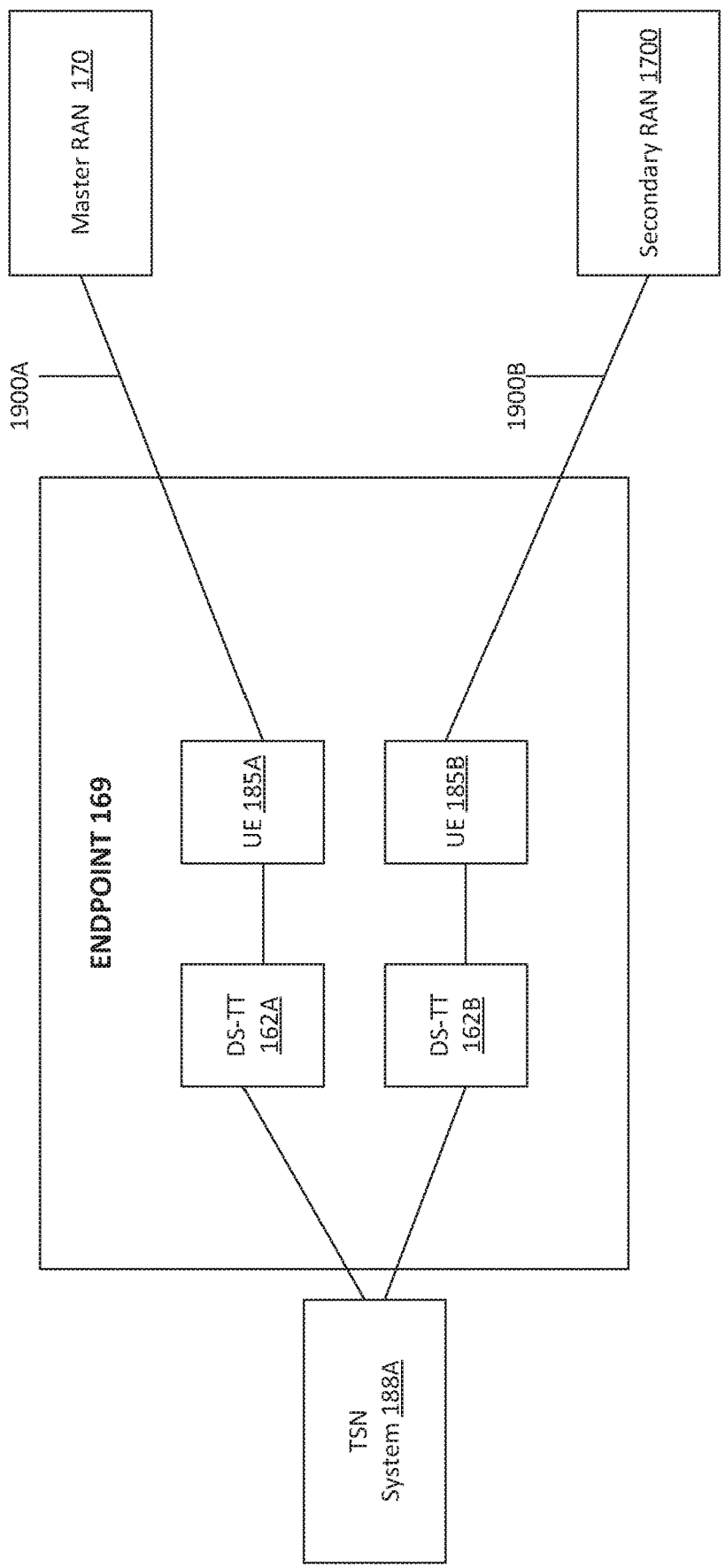
FIG. 1D depicts an example of redundant UEs, in accordance with some example embodiments.

FIG. 1D depicts end point 169 implemented as two UEs 185A-B connected to (or including) two DS-TT 162A-B at the so-called "endpoint" that provides a pair of wired interfaces to the TSN system 188A and a wireless interface towards the 3GPP RANs, in accordance with some example embodiments. The two UEs may be physically proximate to each other (e.g., comprised in the same physical enclosure). When these two UEs are used, the 3GPP network may treat each of the UEs as separate UEs (e.g., for purposes of resource allocation, handover, etc.). Moreover, the 3GPP network may need to be able to identify that the UEs form a redundant pair, and a mechanism may be needed to coordinate actions such as a handover between the two UEs once they have been identified as forming a pair. The two UEs 185A-B may be associated with a corresponding pair of DS-TTs 162A-B (e.g., each UE may include or be coupled to a DS-TT, although the two UEs 185A_B may share a common DS-TT or each UE may be cross-connected to each DS-TT).

In some implementations, each UE 185A-B may be configured as a small form factor module which may be integrated into a larger node containing one or more DS-TT functions 162. Each UE may have a dedicated set of external antenna, which may be oriented in different directions and/or polarization, although the antennas may also have similar directions and/or polarizations. The UEs may each be programmed to use different frequency bands, different network slices, or use other ways to ensure independent network paths, although the UEs may also operate using similar frequency bands, network slices, and/or the like. Alternatively, each UE 185A-B and associated DS-TT functions 162A-B may be integrated into a common module with integrated or external antenna.

In some example embodiments, there is provide a way to coordinate an action, such as a handover, when there are two, redundant UEs 185A-B at the endpoint 169, wherein these redundant UEs are part of redundant PDU sessions carrying TSN data over the 3GPP cellular wireless network.

In some example embodiments, there is provided coordinated actions, such as a handover, by UEs that have setup independent PDU sessions through different base stations (e.g., 5G gNBs, eNBs, as well as other types of base stations) for the purpose of providing end-to-end redundant paths 1900A-B for one or more TSN flows. These UEs may form a redundant UE pair, such as UEs 185A-B or may form a larger redundant set involving three or more UE. The coordination may ensure that at any given time, only one UE 185A will be engaged in an action such as a handover while the other redundant UE 185B pair maintains its current radio connection to enable the flow of traffic to continue. As such, an action, such a handover, will be prevented from occurring simultaneously (e.g., at or about the same time so as to cause an interruption on both paths) on both paths 1900A-B.

In some example embodiments, a RAN Coordination Function (RCoF) may control the coordination of an action, such as a handover, at the gNBs 170 and 1700, so that at least one redundant path is maintained. The RCoF may thus serve as a token coordination function, which tracks pairs of UE, base stations serving the UEs, and controls the token so that only one action such as handover can occur at any given time for the UE pair. In some example embodiments, a token may be used to restrict the action to the base station having the token.

In some example embodiments, the RAN Coordination Function (RCoF) may be implemented using either a centralized architecture or a distributed architecture as described further below with respect to FIGS. 2A-B.

In some example embodiments, the RCoF may be aware of UEs forming a redundant UE pair, such as 185A-B, providing redundant paths from an endpoint. Moreover, the RCoF may manage a token for the UE pair. This token may be shared among the gNB base stations, such as gNBs 170 and 1700, along the redundant paths 1900A-B serving the redundant UE pair 185A-B. In some example embodiments, only the gNB base station that possesses the token is allowed to perform an action, such as a handover, of a UE. Although some of the examples refer to redundant pairs of UEs 185A-B, there may be other quantities in the group of UEs. For example, three UEs may establish redundant PDU sessions for a given TSN flow, each of which is carried through a different gNB. In this example, the token may control which gNB is allowed to perform an action such as a handover at any given time. In the general case, n UEs may establish redundant PDU sessions, with a requirement for ensuring at least m stable connections. That means n-m tokens can be assigned to gNBs for taking actions such as handovers. In the descriptions that follow, we are assuming that n=2 and so m=1 and hence refer to a single token. In some instances, more than one token may be in use at the same time permitting more than one gNB to perform an action such as a handover at any given time.

In some example embodiments, there is provided coordinated actions, such as handovers, by UEs that have setup independent PDU sessions through different gNBs for the purpose of providing E2E redundant paths and forming a redundant UE pair. The coordination may ensure that at any given time, only one UE will be engaged in an action, such as a handover, at a time while the other member of the redundant UE pair maintains its current radio connection. Hence, an unperturbed path between endpoints will always be available for sending TSN traffic.

Figure 2A:
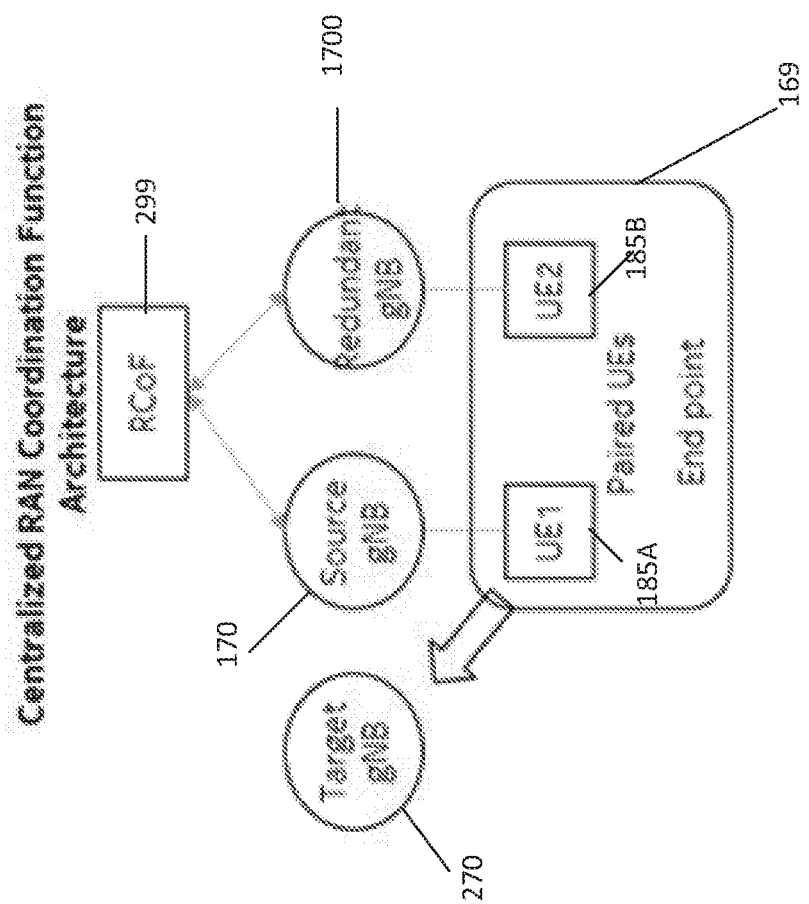
FIG. 2A depicts a centralized RAN Coordination Function (RCoF), in accordance with some example embodiments.

Referring to FIG. 2A, the endpoint 164 includes redundant UEs 185A-B, which have separate (e.g., independent) connectivity to a gNB base station 170 and gNB base station 1700, respectively. In the example of FIG. 2A, a handover is being considered to a target gNB base station 270. Although the example shows a handover of the gNB 170 to the target gNB 270, gNB 1700 may also be the subject of the handover to a target as well.

In the centralized architecture example of FIG. 2A, the RCoF is located centrally in a dedicated RAN node or in the 5G core network (e.g., in the AMF or other node), and messaging between the RCoF and the RAN nodes (e.g., gNB 170, 1700, and 270) may be sent over a dedicated interface or over an existing interface such as N2.

In the centralized architecture of FIG. 2A, the RCoF may track or maintain a list of paired UEs. Moreover, the RCoF may issue a token to enable handover or other action to only one gNB base station at a time. In the centralized architecture, the RCoF may keep track of UE mobility as a source gNB 170 and redundant gNB 1700 can request a token when needed from the RCoF 299, which does not change as UE1 185A and UE2 185B handover. This contrasts with the distributed RCoF architecture (which will be described in the context of FIG. 2B). In the distributed RCoF architecture, the RCoF 298A associated with gNB 170 may know the identity of the RCoF 298B associated with the RAN serving the redundant UE (gNB 1700).

The centralized RCoF 299 may be deployed as a new network function in the RAN or as a service on an existing network function such as a RAN Intelligent Controller (RIC) or in the 5G core network control plane (e.g., as a new service on the AMF 172).

Figure 3:
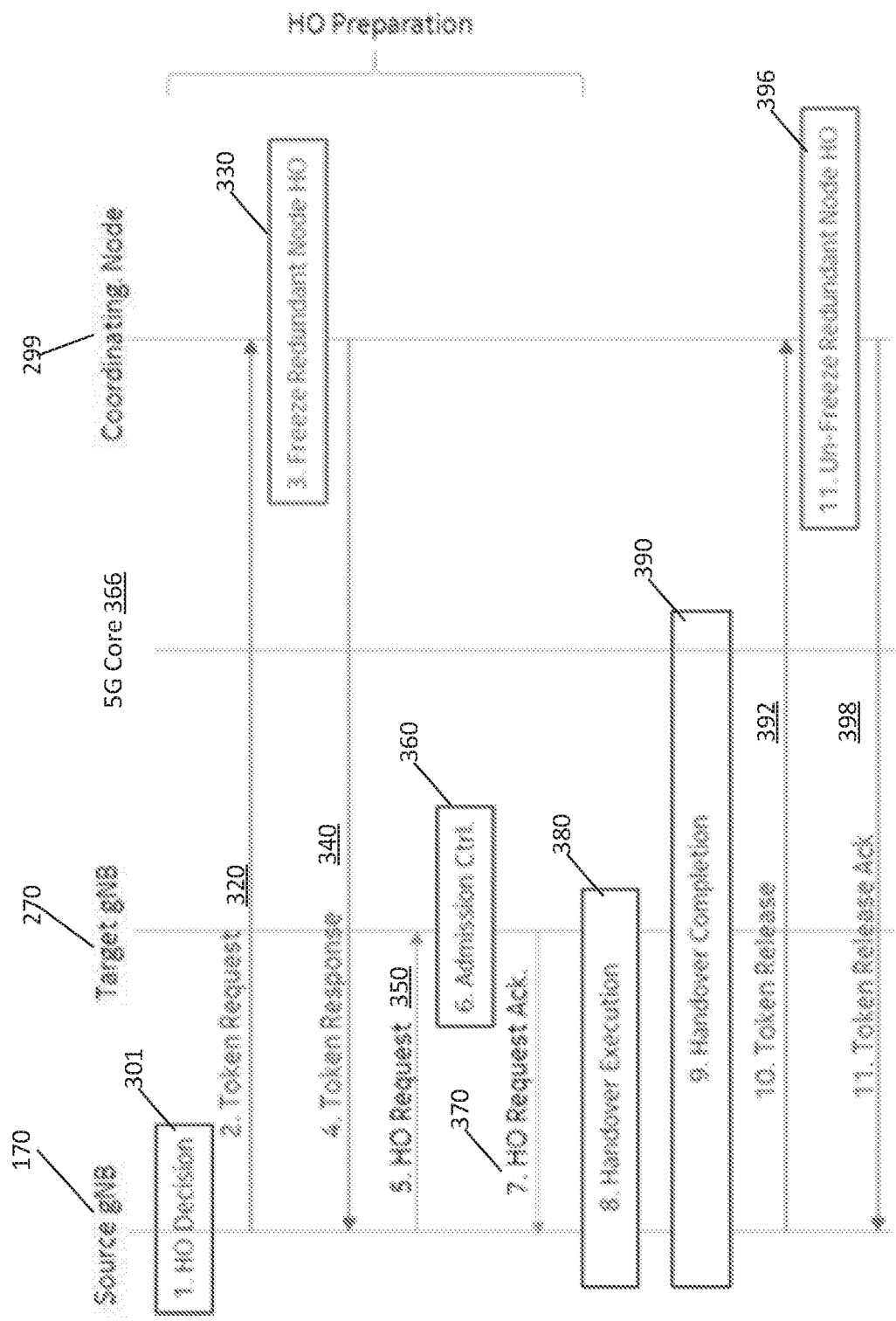
FIG. 3 depicts an example of a process for coordinating an action, such as a handover, in a centralized RCoF configuration, in accordance with some example embodiments.

FIG. 3 depicts an example process for coordinating an action, such as a handover, at the UEs 185A-B providing redundant TSN paths in a centralized RCoF configuration, in accordance with some example embodiments. The description of FIG. 3 also refers to at last FIGS. 1D and 2A.

When a handover decision is made to handover to the target gNB base station 270 at 301, the gNB 170 (which in this example is the source base station that serves the UE 185A and that is seeking a handover to the target gNB base station 270) may send, at 320, a token request to the RCoF 299. The gNB 170 may also send additional information so that the RCoF may use the additional information to assess whether to grant a token to the source gNB 170. Although the token request is shown at 320, the token may be pushed, at 340, as well to the source gNB 170 without an explicit request from the source gNB 170.

If the token for the redundant UEs 185A-B is not currently checked out to the other gNB base station 1700 (which serves the other, redundant UE 185B), the RCoF 299 may freeze (or inhibit) at 330 the release of tokens to the other gNB base station 1700 and issue, at 340, the token in a token response sent to the source gNB 170. To freeze a node such as the gNB, the RCoF may not issue the token until the token has been returned or the token times-out. Regarding the token response at 340, it may include a token if the token is available and thus not checked out to base station 1700. If the token for the redundant UEs 185A-B is currently checked out to the other gNB base station 1700, the RCoF may wait for the other gNB base station 1700 to return the token. Alternatively or additionally, if the token for the redundant UEs 185A-B is currently checked out to the other gNB base station 1700, the RCoF may send a "reject" in the token response to the requesting gNB base station 170. The reject may be in the form of a cause code indicating that the token is not available. In the case of the rejection, the source gNB may then try again after waiting for a time and/or the token may be pushed, at 340, to the source gNB 170 as soon as the token is released back to the RCoF.

Moreover, if the token for the redundant UEs 185A-B is currently checked out to the other gNB base station 1700, the RCoF may respond at 340 with an indication to the source gNB base station 170 that the token is not available, which would indicate to the gNB 170 to delay the handover. The base station without a token may be frozen so that it cannot take an action until it receives a token for the UE.

When the source gNB 170 receives the token at 340, the source gNB base station 170 may determine that it is now allowed to proceed with the handover to the target gNB 270. As such, the source gNB 170 may send, at 350, a handover request message to the target gNB 270, so that the target gNB 270 can perform admission control for the handover at 360. If admitted, the target gNB may send a handover request acknowledgment at 370. At 380-390, the handover may be executed and completed from the source gNB base station 170 to the target gNB 270. Although FIG. 3 depicts the token request 320 and/or token response 340 occurring before admission control 360, the token request 320 and/or token response 340 may occur at other times as well.

When the action such as the handover is completed, the source gNB base station 170 may release the token by sending a message at 392 to the RCoF 299 that may also contain information on the new serving gNB 270. In response to receiving the token release, the RCoF may un-freeze, at 396, the other gNB base station 1700 so that RCoF may now issue tokens to 1700 to allow it to perform actions. At 398, the RCoF may send a token release acknowledgement message to the source gNB 170 and may initiate a connection with the new serving base station 270. Alternatively, the new serving base station 270 may initiate a connection with the RCoF 299 after handover completion 390, and the new serving base station 270 may inform the RCoF that it is currently serving the UE.

Figure 2B:
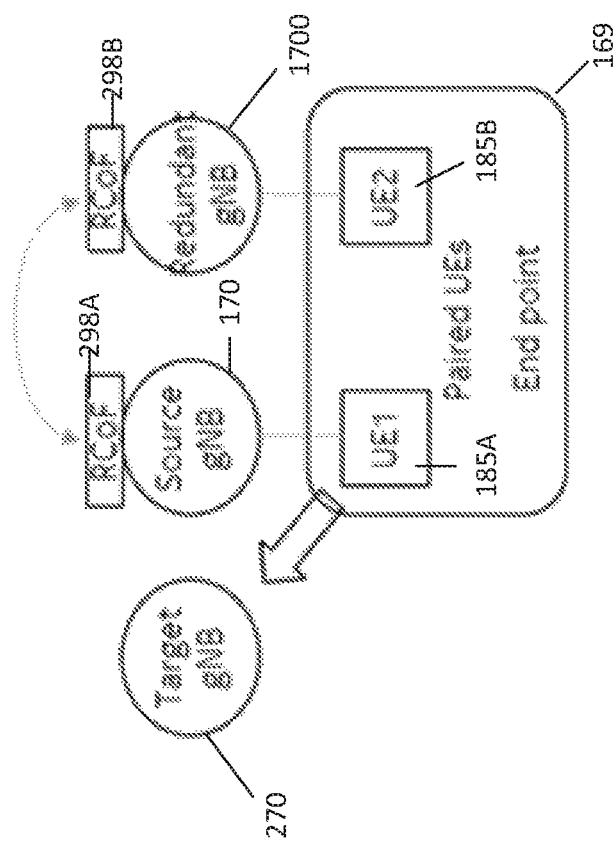
FIG. 2B depicts a distributed RAN Coordination Function (RCoF), in accordance with some example embodiments.

Referring to FIG. 2B, FIG. 2B is similar to FIG. 2A but depicts a distributed RCoF 298A-B, in accordance with some example embodiments. In the example of FIG. 2B, the RCoF is distributed 298A-B across the gNBs 170 and 1700. In the distributed architecture example of FIG. 2B, the RCoF may be a function in the gNBs (e.g., a part of gNB Radio Resource Management (RRM)), and messaging between RCoF/gNBs may be sent over the Xn interface.

In the distributed architecture of FIG. 2B, the RCoF function 298A-B may be incorporated in or associated with each gNB 170-1700. For paired UEs 185A-B for example, one and only one gNB RCoF function may possess the token at a given time. If a trigger (e.g., a handover decision) occurs in a source gNB 170 and the source gNB does not possess the token, the gNB 170 may be required to request the token from the other gNB 1700 serving the paired UEs 185A-B. To send this token request, each RCoF function may know the identity of the gNB serving the paired UEs 185A-B. After handover completion, the source gNB may send a handover completed message to the RCoF function in the gNB serving the paired UE to inform it of the new, target gNB serving the UE. This may enable the RCoF to know the identities of the gNBs serving the paired UEs 185A-B. Initially, the gNB of a paired UE would be made known as part of the registration process. This serving gNB identity information and the token may be transferred from source gNB to the target gNB as part of the handover.

Figure 4:
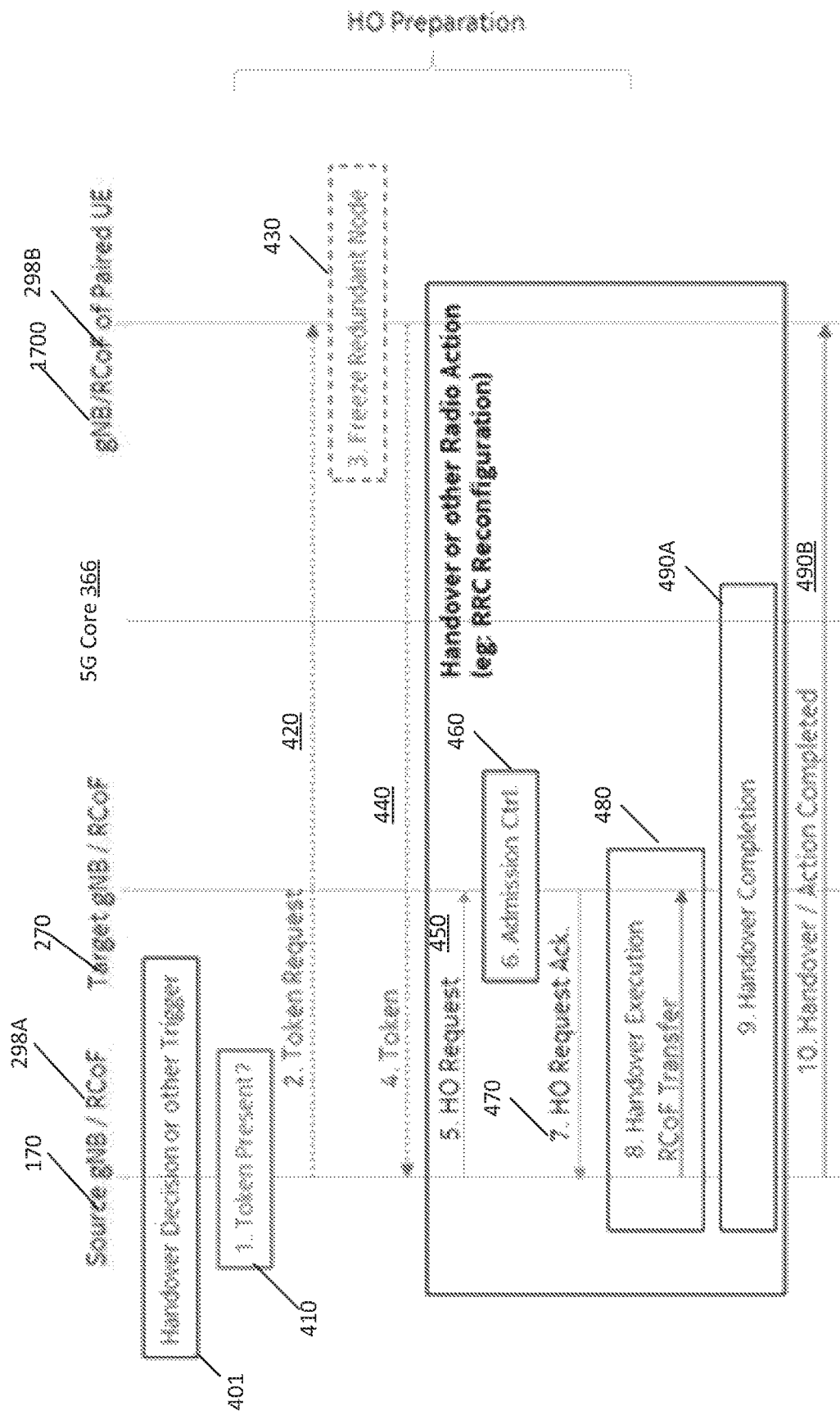
FIG. 4 depicts an example of a process for coordinating an action, such as a handover, in a distributed RCoF configuration, in accordance with some example embodiments.

FIG. 4 depicts an example process for coordinating an action, such as a handover, at the UEs 185A-B providing redundant TSN paths in a distributed RCoF 298A-B configuration, in accordance with some example embodiments. The description of FIG. 4 also refers to at last FIGS. 1D and 2B.

When a handover decision is made to handover to the target gNB base station 270 at 401, the gNB 170 (which in this example is the source base station that is seeking a handover to the target gNB base station 270) may check, at 410, its RCoF 298A to see if a token is present. If a token is present at RCoF, the source gNB 170 may proceed to 450.

If a token is not present at RCoF 298A, the source gNB 170 including RCoF 298A may send, at 420, a token request to the RCoF 298B. The source gNB 170 may also send additional information so that the RCoF 298B may use the additional information to assess whether to grant a token to the source gNB 170. Although the token may be provided in a token response 440 in response to request 420, the token may be provided as a push without an explicit request as well.

If the token for the redundant UEs 185A-B is not currently checked out to the other gNB base station 1700, the RCoF may freeze (or inhibit) at 430 handovers at the other gNB base station 1700 and issue, at 440, the token in a token response sent to the source gNB 170. If the token for the redundant UEs 185A-B is currently checked out to the other gNB base station 1700, the RCoF 298B may wait for the other gNB base station 1700 to return the token or send a request to the other gNB base station 1700 to return the token. Moreover, if the token for the redundant UEs 185A-B is currently checked out to the other gNB base station 1700, the RCoF 298B may respond at 440 with an indication to the source gNB base station 170 that the token is not available, which would indicate to the gNB 170 to delay the handover.

When the source gNB 170 receives the token at 440, the source gNB base station 170 may determine that it is now allowed to proceed with the handover to the target gNB 270. As such, the source gNB 170 may send, at 450, a handover request message to the target gNB 270, so that the target gNB 270 can perform admission control for the handover at 460. If admitted, the target gNB may send a handover request acknowledgment at 470. At 480-490, the handover may be executed and completed from the source gNB base station 170 to the target gNB 270.

Although FIG. 43 depicts the token request 420 and/or token response 440 occurring before handover request 450, the token request 420 and/or token response 440 may occur at other times as well.

In some example embodiments, the RCoF 298A may also be transferred, at 480, to the new, target base station 270. When the action such as the handover is completed 490A, the source gNB base station 170 may release the token by sending a message at 490B to the RCoF 298B. In response to receiving the token release, the RCoF 298B may unfreeze the other gNB base station 1700 so that it can perform actions. RCoF 298A may freeze actions at the new target gNB 270 (as both RCoFs cannot have the token). Alternatively, the token may be transferred with RCoF at 480, to the new, target base station 270. In this case the handover completed message at 490B informs RCoF 298B of the identity of the RCoF associated with gNB 270, so that it may subsequently request a token from the relocated RCoF 298A.

With respect to the token, a token may control an action, such as a handover or other action that can disrupt end-to-end service for the duplicated TSN flows of the dual, redundant paths. The token may be tied to redundant UEs (e.g., UE pairs 185A-B) and the gNB base stations serving the UEs (e.g., 170, 1700, and the like) in the redundant paths. The token may have a lifetime. For example, a token may be issued to the source gNB base station 170, so that subsequent token requests from other base stations 1700 to the RCoF may be denied until the source gNB base station releases the token or the lifetime of the token expires. For example, if gNB 170 does not release the token before the expiry of the token's lifetime, the RCoF may then assign the token to gNB 1700 and freeze gNB 170.

In some example embodiments, the RCoF may receive a request for a token. This request may be a token demand from a gNB that seeks a handover. When this is the case, RCoF may respond with a token, if available (e.g., not check out to another redundant gNB). If the token is not available, the RCoF may request the token back from the gNB that currently has the token in order to respond to the token demand for another base station that may have a higher priority.

Although some of the examples describe a redundant UE pair, the UE redundancy may include more than two UEs, such as 3-way redundant paths where at least two paths are maintained at any time. And, while handover is discussed as the primary task executed by a UE that is part of a redundant pair, other actions may be implemented and controlled using the RCoF and the token-based processes disclosed herein (see, e.g., FIGS. 3 and 4). For example, the token scheme described herein may also manage the coordination of other radio resource management functions between redundant pairs of UE 185A-B. Likewise, the token scheme may control inter frequency handover within the same base station, inter-sector handover within the same base station, RRC re-configuration and/or the like. Additionally, while TSN is described as the primary networking scenario because of its sensitivity to latency and path interruption, other networking scenarios that achieve high reliability using redundant paths may use the token-based mechanism described herein to ensure at least one path is always available.

Figure 5:
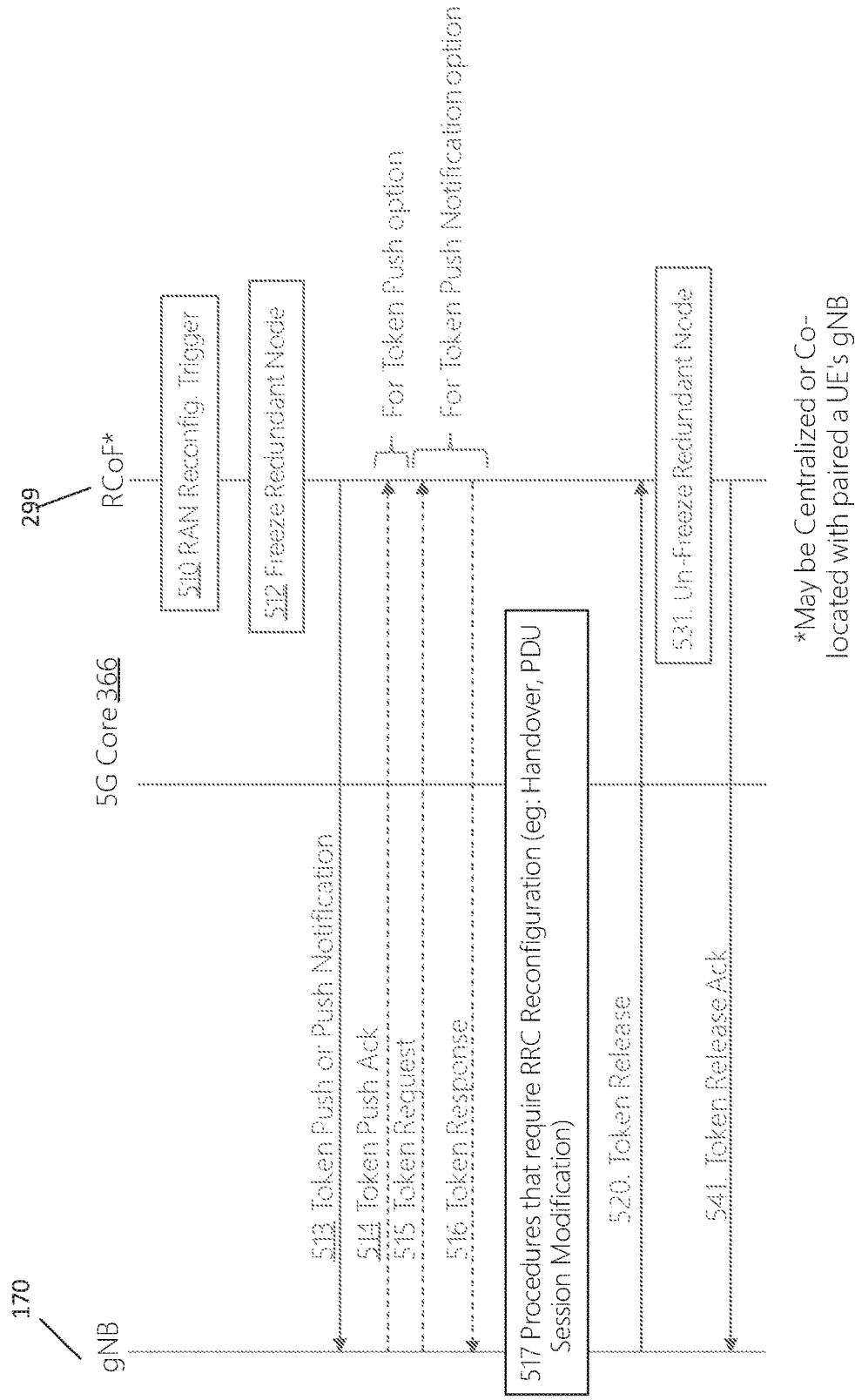
FIG. 5 depicts another process, in accordance with some example embodiments.

FIG. 5 depicts an example process for RCoF initiated token distribution, in accordance with some example embodiments.

At 510, a trigger may occur to trigger the RCoF to push a token to a gNB base station to allow it to perform an action, in accordance with some example embodiments. For example, a message, an application, a service, function, and/or the like may make the RCoF aware of a need for an action, such as a handover, to occur at gNB 170, or after the release of the token from the other gNB node 1700. When this is the case, the RCoF may freeze, at 512, the other gNB node 1700, in accordance with some example embodiments.

The RCoF may, at 513, provide a token to the gNB 170 to enable the gNB 170 to perform the action, in accordance with some example embodiments. The gNB 170 may, at 514, acknowledge receipt of the token, in accordance with some example embodiments.

In some example embodiments, the RCoF notifies, at 513, the gNB 170 that it should request a token. When this is the case, the gNB 170 sends a token request 515, which is responded to with the token at response 516, in accordance with some example embodiments.

At 517, the gNB 170 performs the action now that it has the token, in accordance with some example embodiments. As noted, the action may be a handover, RRC reconfiguration, and/or other types of actions which may interrupt service. Although FIG. 5 depicts the token push/notification 513, token acknowledgement 514, token request 515, and token response 516 occurring before 517, 513-516 may occur at other times as well.

At 520, the gNB 170 sends a message to the RCoF releasing the token, in accordance with some example embodiments. When the token is released, the RCoF may unfreeze the other gNB 1700, in accordance with some example embodiments. When the token is released, the RCoF may also acknowledge at 541 the release by sending a message to the gNB 170.

Figure 6:
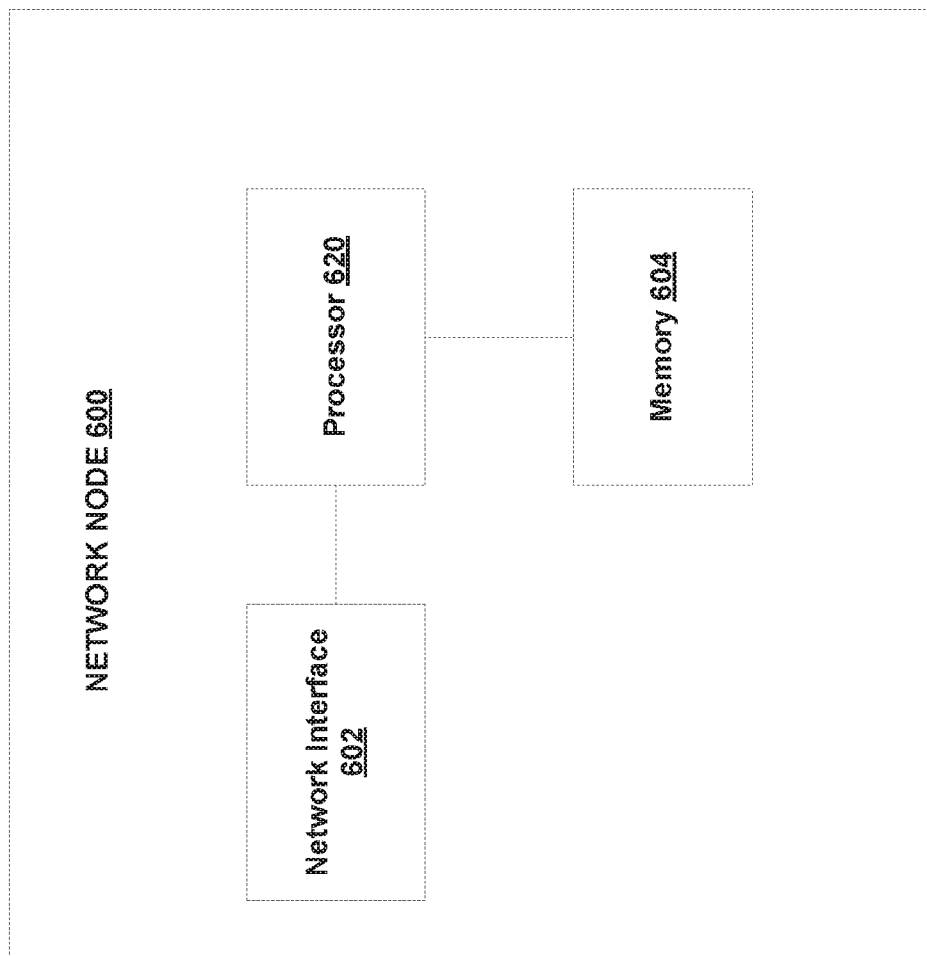
FIG. 6 depicts an example of a network node, in accordance with some example embodiments.

FIG. 6 depicts a block diagram of a network node 600, in accordance with some example embodiments. The network node 600 may be configured to provide one or more network side functions, such as a base station (e.g., gNB), RCoF, AMF 172, PCF 180, AF 150, CNC 104, CUC 102, and/or other network nodes.

The network node 600 may include a network interface 602, a processor 620, and a memory 604, in accordance with some example embodiments. The network interface 602 may include wired and/or wireless transceivers to enable access other nodes including base stations, devices 152-180, the Internet, and/or other nodes. The memory 604 may comprise volatile and/or non-volatile memory including program code, which when executed by at least one processor 620 provides, among other things, the processes disclosed herein with respect to the network node (see, e.g., processes at FIGS. 3-5 and/or the like).

For example, the network node 600 may be the gNB 170 serving UE 185A. In this example, the network node 600 may determine that a first user equipment is part of a group of user equipment including the first user equipment and a second user equipment. For example, the network node may determine that the endpoint 169 includes a redundant pair of UEs configured to each provide a protocol data unit session to carry redundant time sensitive data streams obtained from TSN system 188A as shown at FIG. 1D. The network node may also receive from a token coordination function, such as the RCoF and/or other node, a token response. This response may be in response to an explicit request from the network node or may be pushed from the token coordination function without a formal request from the network node. If the token response from the token coordination function includes a token, the network node allows the action, such as a handover and/or other action. If the token response from the token coordination function does not includes the token, the network node inhibits the action.

Moreover, the network node may send a request to the token coordination function for the token. The network node may also determine whether the token is present at the network node before the request for the token is sent to the token coordination function. If the token response include an indication that the token is not available, the indication may tell the network node to inhibit the action.

The network node may also be implemented to provide the token coordination function, such as the RCoF. When that is the case, the network node may control an action at a group including a first user equipment being served by a first base station and a second user equipment being served by a second base station. Each of the first user equipment and the second user equipment may be configured with a protocol data unit session to carry redundant time sensitive streams. As noted herein the control may include providing a token to enable at a time the action at a single one of the first user equipment or the second user equipment.

Figure 7:
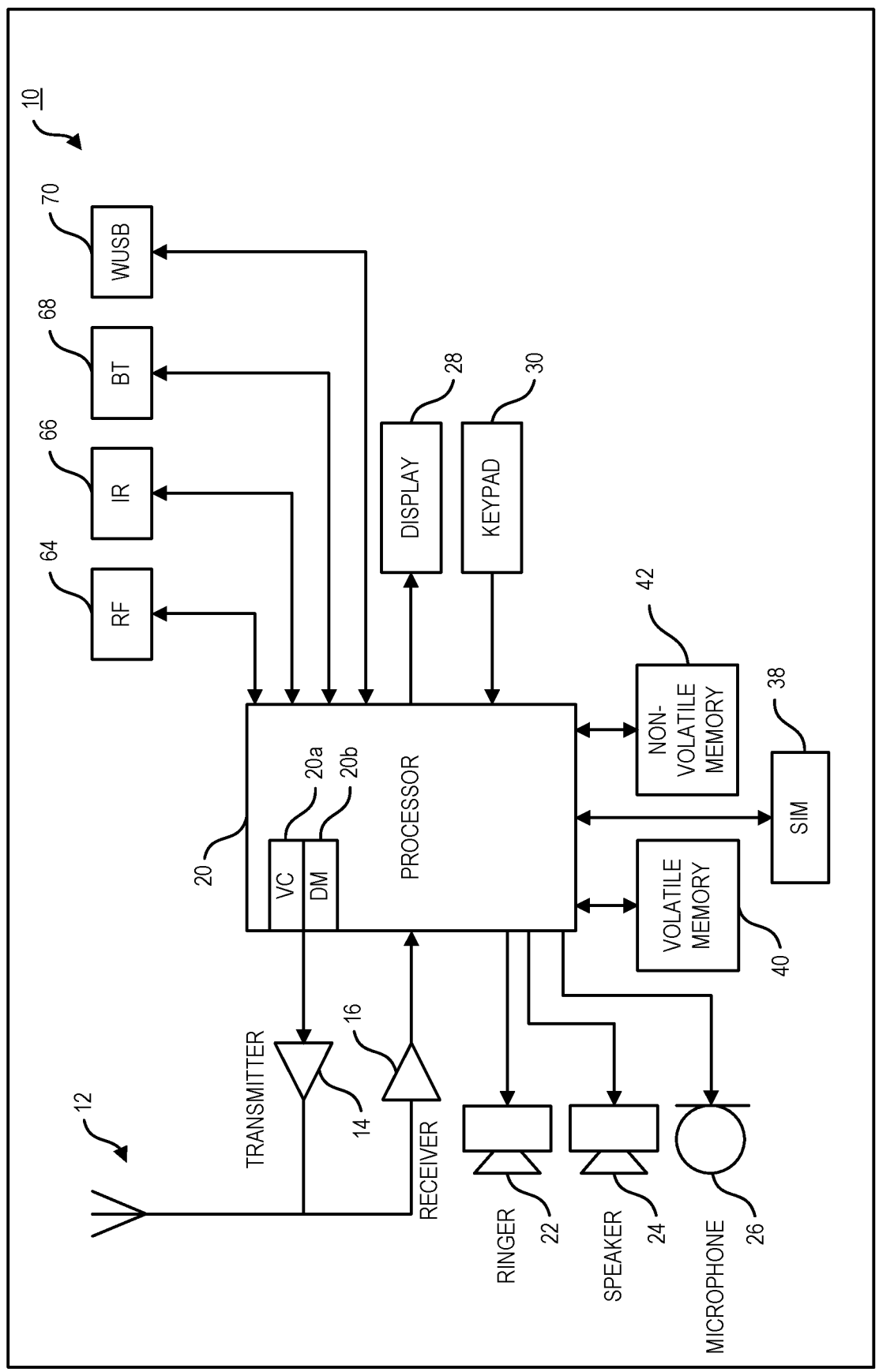
FIG. 7 depicts an example of an apparatus, in accordance with some example embodiments.

FIG. 7 illustrates a block diagram of an apparatus 10, in accordance with some example embodiments.

The apparatus 10 may represent a user equipment, such as the user equipment 164, 185A, 185B, and/or the like. Each of the UE's may include a TT. Moreover, the UE may include a wired interface to the TSN system or end station and a wireless interface to the cellular wireless network. As noted, the UE may include a plurality of UEs, each of which may include circuitry to enable communications with a base station. The apparatus 10, or portions therein, may be implemented in other network nodes including base stations/ WLAN access points as well as the other network nodes.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced operations of TSN networks and/or operations of 3GPP, cellular networks carrying URLLC traffic.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
      determine a first user equipment is part of a group of redundant user equipments including the first user equipment and a second user equipment, each of the first user equipment and the second user equipment configured with a protocol data unit session to carry alternately redundant time sensitive data streams, wherein a first packet of data is transmitted over a first data path, and a second packet of data is transmitted over a second data path;
      receive, from a token coordination function, a token response, wherein the token response is in response to an explicit request from a network node, and wherein the network node determines whether the token is present at the network node prior to sending the explicit request, wherein if the token for the redundant user equipments is not currently checked out to a first base station, handovers are frozen at the first base station, and wherein if the token for the redundant user equipments is currently checked out to a second base station, the token coordination function waits for the second base station to return the token, and includes in the token response, that the token is not available;
      allow an action, when the token is received in the token response; and
      inhibit the action, when the token is not included in the token response and/or the token is expired.

2. The apparatus of claim 1, wherein the apparatus is further caused to at least request, from the token coordination function, the token.

3. The apparatus of claim 1, wherein the received token response includes an indication that the token is not available, the indication indicating to the apparatus to inhibit the action.

4. The apparatus of claim 1, wherein the action comprises at least one of a handover to a target base station serving the first user equipment or the second user equipment, and a radio resource control reconfiguration.

5. A method comprising:
   determining a first user equipment is part of a group of redundant user equipments including the first user equipment and a second user equipment, each of the first user equipment and the second user equipment configured with a protocol data unit session to carry alternately redundant time sensitive data streams, wherein a first packet of data is transmitted over a first data path, and a second packet of data is transmitted over a second data path;
   receiving, from a token coordination function, a token response, wherein the token response is in response to an explicit request from a network node, and wherein the network node determines whether the token is present at the network node prior to sending the explicit request, wherein if the token for the redundant user equipments is not currently checked out to a first base station, handovers are frozen at the first base station, and wherein if the token for the redundant user equipments is currently checked out to a second base station, the token coordination function waits for the second base station to return the token, and includes in the token response, that the token is not available;

allowing an action, when the token is received in the token response; and inhibiting the action, when the token is not included in the token response and/or the token is expired.

6. The method of claim 5, further comprising requesting, from the token coordination function, the token.

7. The method of claim 6, further comprising determining whether the token is present at the apparatus before the request for the token is sent to the token coordination function.

8. The method of claim 5, wherein the received token response includes an indication that the token is not available, the indication indicating to the apparatus to inhibit the action.

9. The method of claim 5, wherein the token response is received in response to the request for the token being sent to the token coordination function.

10. The method of claim 5, wherein the token response is received as a push from the token coordination function, without the request for the token being sent to the token coordination function.

11. The method of claim 5, wherein the action comprises at least one of a handover to a target base station serving the first user equipment or the second user equipment, and a radio resource control reconfiguration.

* * * * *